A. NASH.
TROLLEY.
APPLICATION FILED AUG. 15, 1910.
1,000,189.
Patented Aug. 8, 1911.
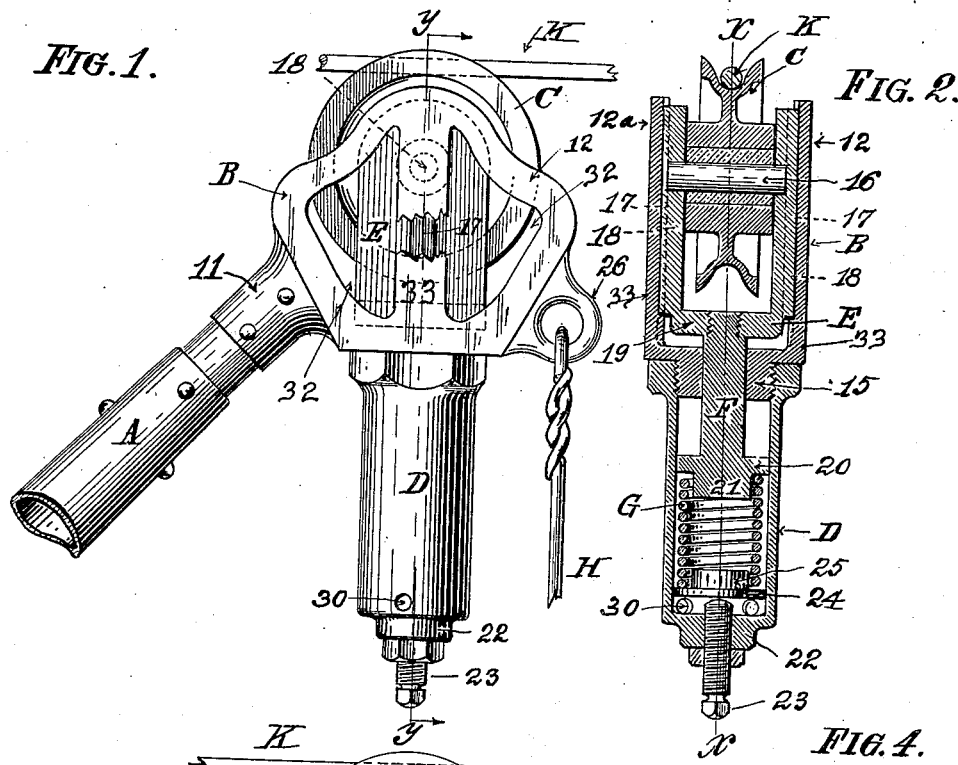
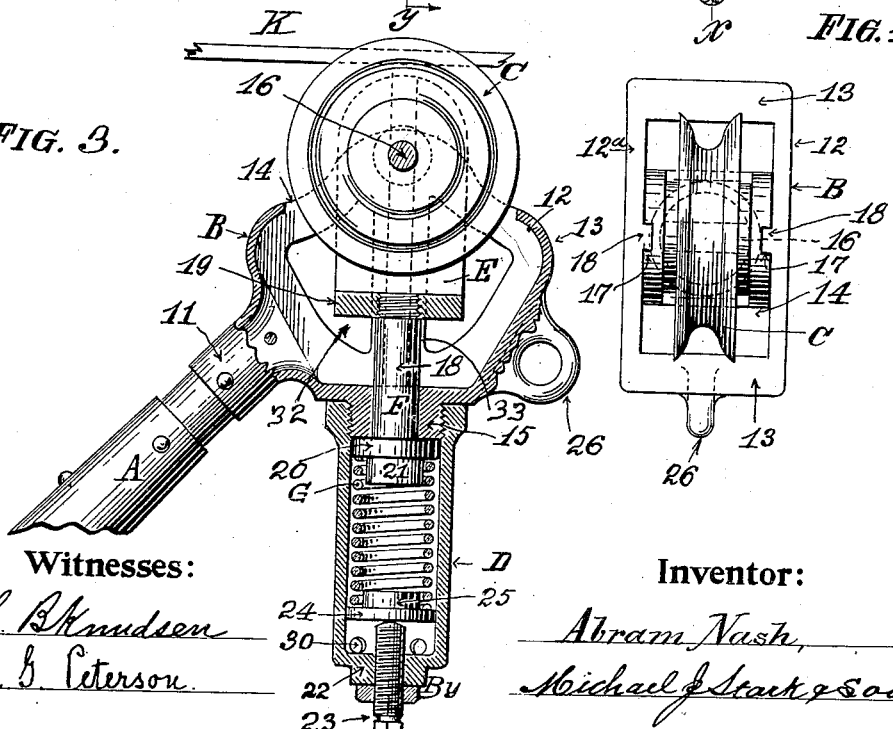
Witnesses:
C. B. Knudsen
A. B. Peterson
Inventor:
Abram Nash,
By Michael J. Stack & Sons
Attorneys.

UNITED STATES PATENT OFFICE.

ABRAM NASH, OF CHICAGO, ILLINOIS, ASSIGNOR OF ONE-HALF TO W. A. PRATER, OF CHICAGO, ILLINOIS.

TROLLEY.

1,000,189.  Specification of Letters Patent.  Patented Aug. 8, 1911.

Application filed August 15, 1910. Serial No. 577,289.

*To all whom it may concern:*

Be it known that I, ABRAM NASH, a citizen of the United States, and resident of Chicago, in the county of Cook and State of Illinois, have invented certain new and useful Improvements in Trolleys; and I do hereby declare that the following description of my said invention, taken in connection with the accompanying sheet of drawings, forms a full, clear, and exact specification, which will enable others skilled in the art to which it appertains to make and use the same.

This invention has general reference to trolleys for electrically operated vehicles; and it consists, essentially, in the novel and peculiar combination of parts and details of construction, as hereinafter first fully set forth and described and then pointed out in the claims.

In the drawings already referred to, which serve to illustrate this invention more fully. Figure 1 is a side elevation of my improved trolley. Fig. 2 is a sectional elevation on line $y\ y$ of Fig. 1. Fig. 3 is a sectional elevation on line $x\ x$ of Fig. 2. Fig. 4 is a plan of the device, the trolley pole and the overhead electro conductor being omitted.

Like parts are designated by corresponding symbols and characters of reference in all the figures.

The object of this invention is the production of an efficient trolley for electrically operated vehicles, such as street cars, and the like, which will effectually prevent sparking caused in existing installations by the vibrations of the trolley pole when the cars are in operation.

A, in the drawings designates the usual trolley pole of an electrically operated vehicle, such as a surface street railway car, etc., and B, designates the harp secured to the upper end of said pole A, there being on said harp a socket 11, to engage said pole in the usual manner of pinning, or any other suitable method. This harp B, which in the present instance is approximately shield-shaped but may be of any other desirable contour, comprises two side members 12, 12$^a$, in parallel spaced relation and surrounded at their edges by an outer wall 13, open at its upper part as indicated at 14 in Figs. 3 and 4, to permit the trolley wheel C to pass partly through said opening 14. The side members 12, 12$^a$, have openings 32, to permit water entering the space in said harp to escape therefrom, said openings being so disposed as to leave a central bar 33, in each side member for the object hereinafter to be set forth. At the lower part of this wall 13, there is a round boss 15, externally screw threaded to receive an internally screw threaded socket or cylinder D, the object of which will hereinafter more fully appear.

In the harp B there is located a forked member E, in which the trolley wheel C is pivoted by the pivotal bolt 16. In the outer sides of this forked member there are grooves 17, (one on each outer side), vertically disposed, and in the inner opposite sides of the bars 33 of the harp members 12, 12$^a$, there are corresponding projections 18, which engage the grooves 17, with a sliding fit, thereby guiding said fork E with its trolley wheel C in said harp in an efficient manner.

In the member 19 of the fork E there is a tapped hole, wherewith engages a screw threaded bolt F, which bolt passes centrally through the boss 15 on the harp B. This bolt has, near its lower end an annular, outwardly projecting collar 20, constructed to engage the bore of the socket D with a sliding fit. Below this collar 20 there is boss 21, serving as a guide to a spiral spring G.

In the bottom 22 of the socket D, which may be formed integral with the socket D, or otherwise connected thereto, there is a tapped central hole wherewith engages an adjusting screw 23, which screw bears upon a disk 24, located in the lower portion of said socket D, and which is provided with a boss 25, similar to the boss 21 on the collar 20, to engage the lower end of said spiral spring G.

From the outer wall 13 of the harp B projects an eye 26, to which a rope H is hitched by means of which the trolley pole is manipulated. The side members 12 12$^a$ of this harp may be solid walls, or they may be open as shown in the Figs. 1 and 3, to relieve the pole A from any excessive or unnecessary weight.

In Fig. 3, I have shown the fork E in its normal position in which position the upper end of the fork E projects beyond the upper end of the harp B a short distance, and in which position the fork E is prevented from further upward movement by the boss 15 on the harp. When in use, the trolley wheel engages the overhead electro conductor K which depresses the trolley wheel C somewhat and compresses the spiral spring G accordingly to a greater or lesser degree, the tension of said spring being regulated by the adjusting screw 23. Should the trolley pole vibrate, as it generally does when the car is in motion, the up-and-down movement of said pole will be compensated for by the spiral spring G causing the fork E and the trolley wheel C to move vertically in the harp so that the trolley wheel C is always kept in contact with the overhead electro conductor, thereby preventing the arcing of the current and consequent loss of power.

I have heretofore described the preferred embodiment of my invention, which, however, is susceptible to many changes in the minor details of construction. For instance, while I have shown in Fig. 4 the vertical projections 18 on the inner surfaces of the harp and the corresponding grooves in the fork, I have illustrated in Fig. 1 a reversal of this arrangement by locating the projections on the fork, and the grooves in the inner surface of the harp. This and other modifications may be resorted to by persons skilled in the art to which my invention appertains without departing from the scope of the same.

In order that rain, snow, or ice may not interfere with the proper functioning of this device, I provide in the lowermost part of the socket D a number of openings 30, through which water will readily escape and prevent the formation of ice in said socket.

I have heretofore stated that the main object of this invention is to prevent sparking caused by the vibrations of the trolley pole while the car is in motion, but a further, very desirable result is also obtained by this present construction, which is the prevention of the trolley wheel leaving the overhead electro conductor, because, owing to the spring-supported trolley fork in which the trolley wheel is mounted, the latter is enabled to keep in contact with the overhead conductor notwithstanding the vibrations of the trolley pole. This latter effect is also a very important one, and it is accomplished by my present construction, in a very effective manner.

Having thus fully described this invention, I claim as new and desire to secure to me by Letters Patent of the United States—

1. A trolley for electrically operated vehicles, including, in combination, a pole, a harp at the outer end of said pole, a fork in said harp, a trolley wheel mounted in said fork, a downwardly projecting cylinder removably secured to said harp, a bolt in said cylinder engaging said fork, said bolt having a collar engaging the bore of said cylinder, a spiral spring in said cylinder and adapted to press against said bolt, an adjusting screw at the lower end of said cylinder, and a disk in said cylinder constructed to support the lower end of said spiral spring, as and for the object stated.

2. A trolley for electrically operated vehicles, comprising, in combination, a pole, a harp at the outer end of said pole, said harp having on its inner surfaces projections, a fork in said harp, said fork having grooves adapted to engage said projections, a trolley wheel mounted in said fork, there being on said harp an externally screw threaded boss at its lower end, a socket in screw threaded engagement with said boss, a bolt in said socket engaging said fork, said bolt having a collar slidingly engaging the bore of said socket, the bottom of said socket being tapped, an adjusting screw engaging said tapped bottom, a disk in the lower portion of said socket, and a spiral spring in said socket, one end of said spiral spring engaging said bolt, and the other end engaging said disk, as stated.

3. A trolley for electrically propelled vehicles, comprising, a pole, a harp at the outer end of said pole, said harp including two side members in spaced relation, said side members being connected to each other at their lower ends, and a tubular boss projecting angularly from said side members and constructed to receive the upper end of said pole, said side members having openings and affording a central bar in each side member, said bars having projections on their inner walls, a fork located between said side members, said fork having grooves in its outer faces constructed to slidingly engage the projections on said central bars, a trolley wheel journaled in said fork, an externally screw-threaded boss at the lower end of said harp, an internally screw-threaded cylinder constructed to removably engage said boss, a bolt in said cylinder constructed to engage said fork at one end, there being on said bolt a collar constructed to engage the bore of said cylinder with a sliding fit, a spiral spring in said cylinder constructed to engage said bolt below said collar, a disk in said cylinder below said spiral spring constructed to support the lower end of said spiral spring, and an adjusting screw in the lower end of said cylinder constructed to support said disk, as set forth.

In testimony that I claim the foregoing as my invention, I have hereunto set my hand in the presence of two subscribing witnesses.

ABRAM NASH.

Witnesses:
 MICHAEL J. STARK,
 A. G. PETERSON.